United States Patent
Xu et al.

(10) Patent No.: US 10,694,216 B2
(45) Date of Patent: Jun. 23, 2020

(54) VIDEO CODING USING SEPARATE LEARNING AND FILTERING PATHWAYS

(71) Applicant: GOOGLE LLC, Mountain View, CA (US)

(72) Inventors: Ruijie Xu, Sunnyvale, CA (US); Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/127,637

(22) Filed: Sep. 11, 2018

(65) Prior Publication Data

US 2020/0084478 A1 Mar. 12, 2020

(51) Int. Cl.
*H04N 19/91* (2014.01)
*H04N 19/124* (2014.01)
*H04N 19/13* (2014.01)
*H04N 19/70* (2014.01)

(52) U.S. Cl.
CPC .......... *H04N 19/91* (2014.11); *H04N 19/124* (2014.11); *H04N 19/13* (2014.11); *H04N 19/70* (2014.11)

(58) Field of Classification Search
CPC ...... H04N 19/117; H04N 19/44; H04N 19/85; H04N 19/91; H04N 19/124; H04N 19/13; H04N 19/70
USPC ............ 375/240.03, 240.08, 240.25, 240.29
See application file for complete search history.

(56) References Cited

U.S. PATENT DOCUMENTS

| | | |
|---|---|---|
| 9,584,814 B2 | 2/2017 | Socek et al. |
| 2018/0192046 A1 | 7/2018 | Teo et al. |
| 2018/0359480 A1* | 12/2018 | Xiu ................ H04N 19/70 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.

(Continued)

*Primary Examiner* — Dominic D Saltarelli
(74) *Attorney, Agent, or Firm* — Young Basile Hanlon & MacFarlane, P.C.

(57) ABSTRACT

Separate pathways for filtering and for machine learning are introduced within a video coder. A first pathway filters a first copy of a reconstructed frame to produce a filtered frame, which is included in an output video stream for display at a user device. A second pathway processes a second copy of the reconstructed frame using a learning model, such as for training and/or inference. The first and second pathways are introduced after the reconstruction stage of an encoder or decoder. The input to each of the first and second pathways is thus produced without using a non-injective function, and, while the first pathway includes at least one non-injective function, the second pathway does not. As a result, training the learning model using the second copy of the reconstructed frame results in a greater classification accuracy upper bound than training the learning model using the filtered frame.

20 Claims, 9 Drawing Sheets

(56) References Cited

OTHER PUBLICATIONS

Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Vaidyanath, Suchethan Swaroop; "Low Complexity H.264 Encoder Using Machine Learning for Streaming Applications"; 2011; pp. 1-74.
Carrillo, Paula; "Low Complexity H.264 Video Encoder Design Using Machine Learning Techniques"; Florida Atlantic University; Dec. 2008; pp. 1-59.
Zhang et al; "Real-Time Action Recognition With Deeply Transferred Motion Vector CNNs", IEEE Transactions on Image Processing, IEEE Service Center, Piscataway, NJ, US, vol. 27, No. 5, May 1, 2018 (May 1, 2018), pp. 2326-2339.
Ranjbar et al: "Can You Tell a Face from a HEVC Bitstream?", 2018 IEEE Conference on Multimedia Information Processing and Retrieval (MIPR), IEEE, Apr. 10, 2018 (Apr. 10, 2018), pp. 257-261.
Wu et al; "Action Recognition", 2018 IEEE/CVF Conference on Computer Vision and Pattern Recognition, IEEE, Jun. 18, 2018 (Jun. 18, 2018), pp. 6026-6035.
International Search Report and Written Opinion of International Application No. PCT/US2019/047134 dated Nov. 13, 2019; 17 pages.

\* cited by examiner

US 10,694,216 B2

VIDEO CODING USING SEPARATE LEARNING AND FILTERING PATHWAYS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A decoder according to an implementation of this disclosure comprises an entropy decoding stage, a dequantization stage, an inverse transform stage, a reconstruction stage, a first post-reconstruction pathway, and a second post-reconstruction pathway. The entropy decoding stage entropy decodes syntax elements representative of an encoded video frame from an encoded bitstream to produce quantized transform coefficients. The dequantization stage dequantizes the quantized transform coefficients to produce transform coefficients. The inverse transform stage inverse transforms the transform coefficients to produce a prediction residual. The reconstruction stage reconstructs the prediction residual to produce a reconstructed frame. The first post-reconstruction pathway filters a first copy of the reconstructed frame using one or more filtering techniques to produce a filtered frame, wherein the filtered frame is included in an output video stream for display at a user device. The second post-reconstruction pathway trains a learning model using a second copy of the reconstructed frame. Training the learning model using the second copy of the reconstructed frame results in a greater classification accuracy upper bound for the learning model than training the learning model using the filtered frame.

A method according to an implementation of this disclosure comprises dequantizing quantized transform coefficients representative of the encoded video data to produce transform coefficients. The method further comprises inverse transforming the transform coefficients to produce a prediction residual. The method further comprises reconstructing the prediction residual to produce a reconstructed frame. The method further comprises filtering a first copy of the reconstructed frame to produce a filtered frame. The method further comprises processing a second copy of the reconstructed frame using a learning model to identify video content.

An integrated circuit according to an implementation of this disclosure comprises a processor that executes instructions. The instructions comprise decoding encoded video data from an encoded bitstream to produce a reconstructed frame. The instructions further comprise processing a first copy of the reconstructed frame over a first decoding pathway using an in-loop filter to produce an output video stream for display at a user device. The instructions further comprise processing a second copy of the reconstructed frame over a second decoding pathway by using a learning model to identify video content.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
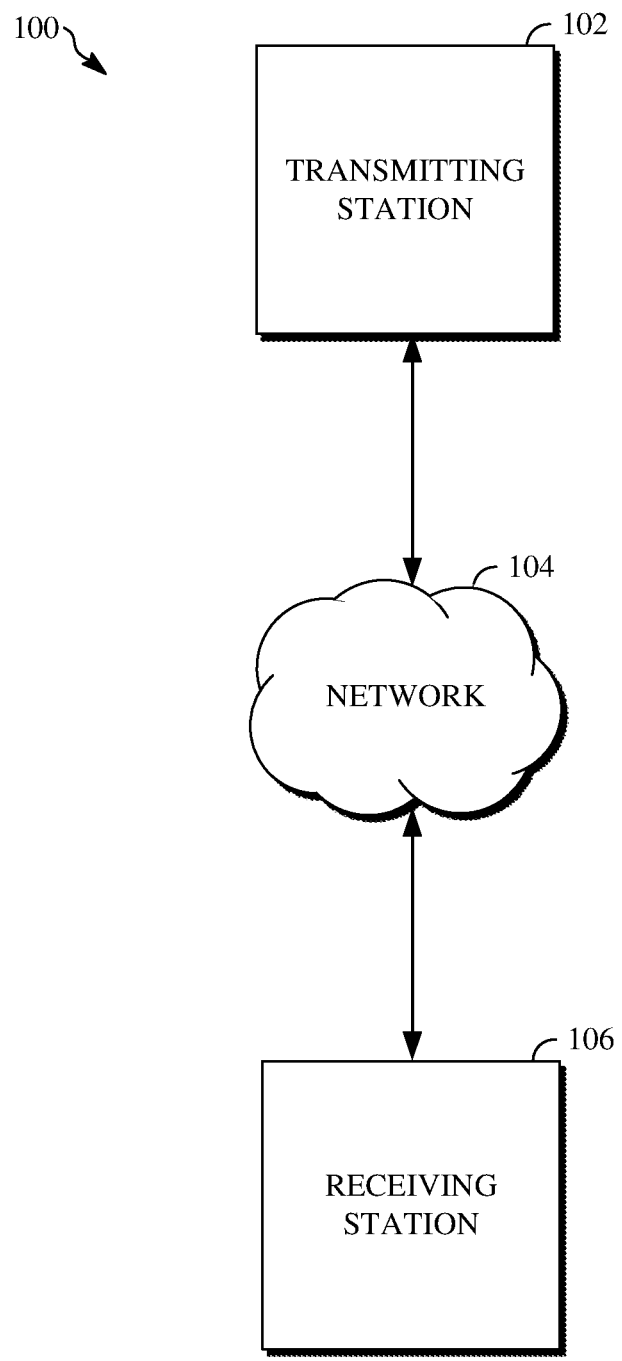
FIG. 1 is a schematic of an example of a video encoding and decoding system.

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information. Typical video compression and decompression techniques use a number of tools to improve coding efficiency, which may be measured by both rate and distortion. Many of these tools use injective functions having one-to-one mappings between the input and output. As such, the input to an injective function can be identified and recovered from the output of that injective function. However, some of those tools use non-injective functions having one-to-many mappings between the input and output. The use of a non-injective function thus results in some information loss.

For example, a typical decoder processes a compressed bitstream through a series of decoding stages and ultimately transmits the output of the last decoding stage in an output video stream. Each decoding stage applies a function on the input it receives from an earlier decoding stage in the series and produces output for use at a later decoding stage in the series. Many of these decoding stages (e.g., entropy decoding, dequantization, inverse transform, prediction, and reconstruction stages) use only injective functions; however, some of these decoding stages (e.g., filtering stages) use non-injective functions. The use of a non-injective function causes the output video stream to no longer have a one-to-one mapping to the compressed bitstream.

In some cases, an encoder or decoder may include machine learning aspects, such as for training a learning model to identify video content and/or for performing inference against video content. A common approach to machine learning in video coding is use the output of the decoding pipeline as the input for the learning model. Thus, during decoding, the output of the last decoding stage (e.g., filtering) is used as input for the learning model. Similarly, during encoding, the output of the last reconstruction path stage (e.g., filtering) may be used as input for the learning model.

However, this approach suffers drawbacks due to the information lost from video coding using non-injective functions. For example, filtering techniques performed during encoding or decoding cosmetically treat video data for human viewing purposes, such as by reducing blocking artifacts within a video frame to improve the overall appearance of the video. The changes made by the filtering result in information loss, which may negatively impact the performance of the learning model. For example, the learning model may misclassify video content output from the filtering due to the information lost from the filtering. Such misclassifications may harm or limit the accuracy of the machine learning.

As such, the machine learnings aspects of an encoder or decoder may conceivably benefit from the removal of non-injective functions (e.g., filtering stages) in an encoder or decoder. However, those non-injective functions may still be important to the encoding or decoding processes. For example, a typical encoder or decoder may cache the output of a filtering stage for use in prediction of future frames. Therefore, it is infeasible to remove non-injective functions from encoders and decoders.

Implementations of this disclosure address problems such as these using separate pathways for filtering and for machine learning within a video coder. A first pathway filters a first copy of a reconstructed frame to produce a filtered frame, which is included in an output video stream for display at a user device. A second pathway processes a second copy of the reconstructed frame using a learning model (e.g., for training and/or inference). The first and second pathways are introduced after the reconstruction stage of an encoder or decoder. The input to each of the first and second pathways is thus produced without using a non-injective function, and, while the first pathway includes at least one non-injective function, the second pathway does not.

As a result, training the learning model using the second copy of the reconstructed frame results in a greater classification accuracy upper bound for the learning model than training the learning model using the filtered frame. Thus, training the learning model using the second copy of the reconstructed frame improves or at least maintains the then-current performance ceiling of the learning model. Separating the learning and filtering pathways further benefits the machine learning aspects of the video coder in that the learning pathway avoids the computational complexities associated with filtering video data.

Further details of techniques for video coding using separate learning and filtering pathways are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
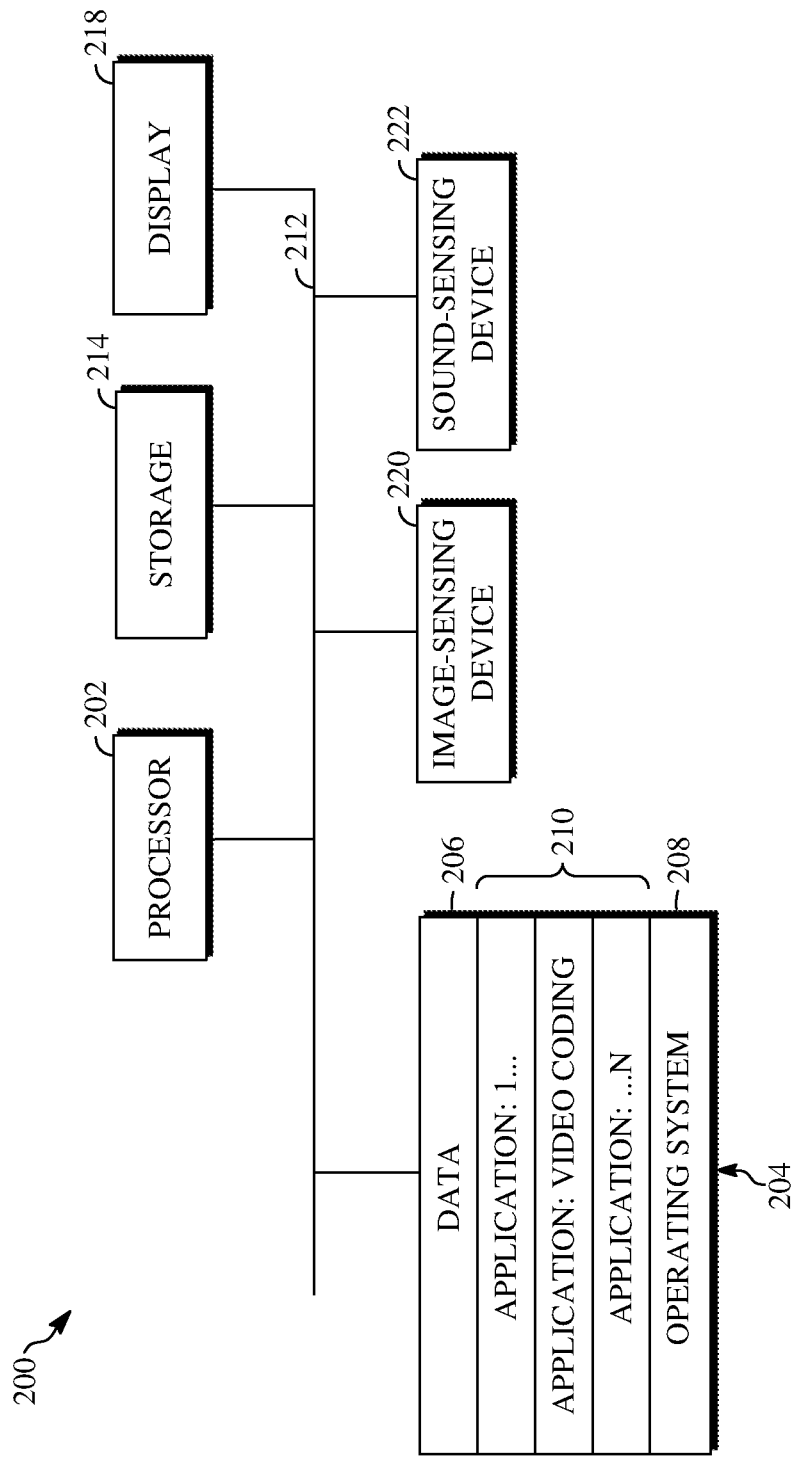
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video and/or image coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
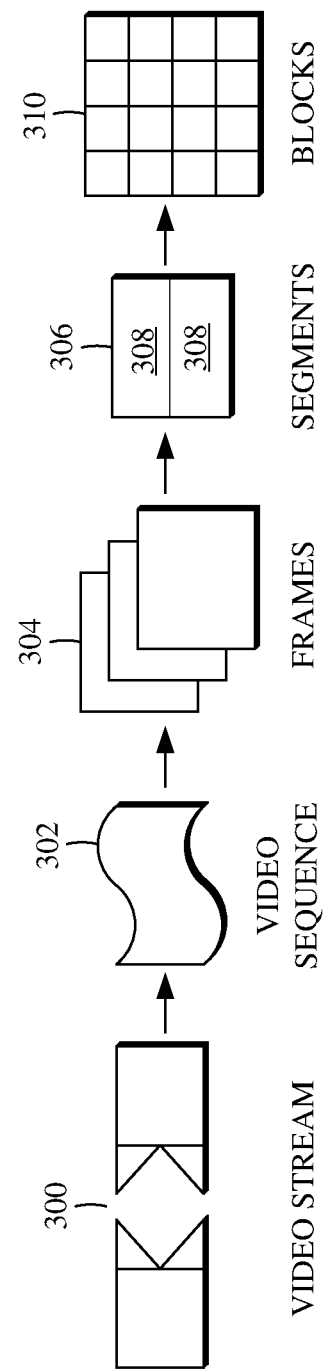
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
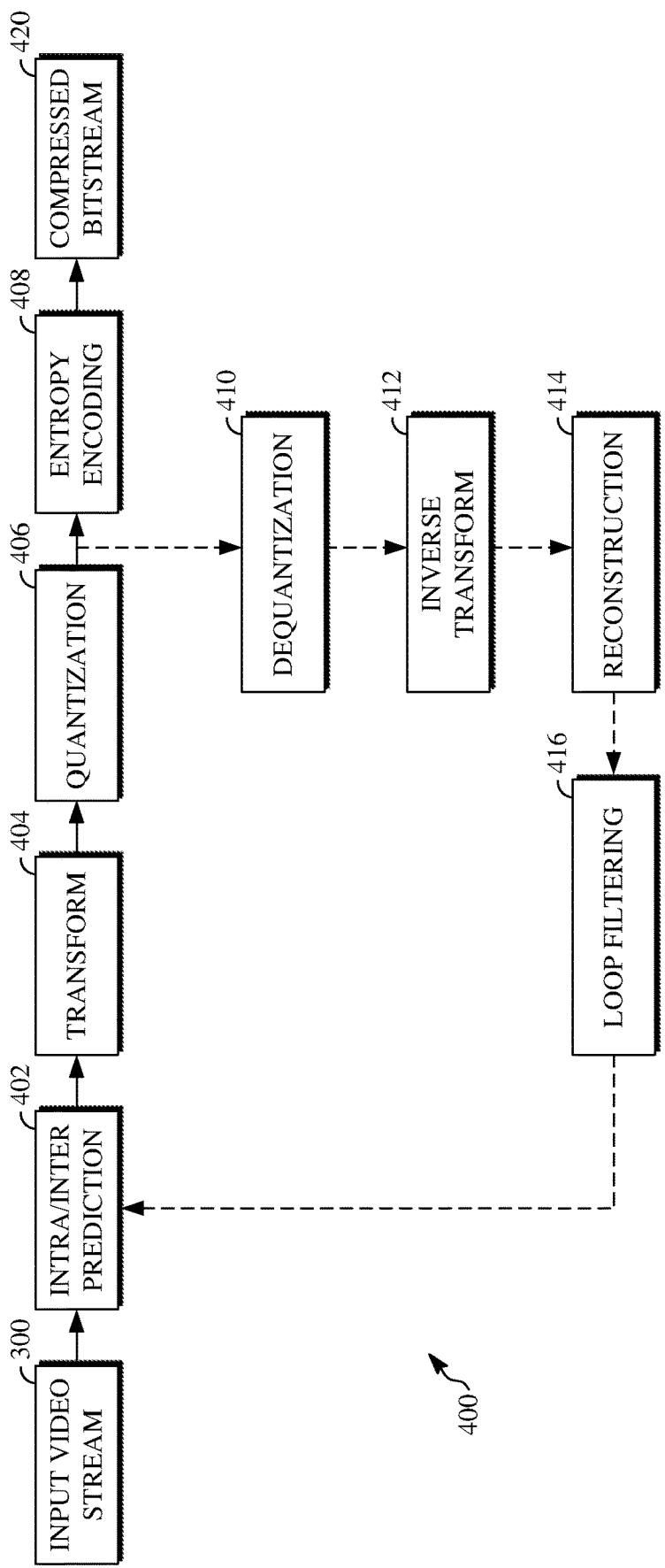
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters include, without limitation: a deblocking filter as in H.264, VP9, HEVC, and AV1; a Constrained Directional Enhancement Filter as in AV1; and a loop restoration filter as in AV1.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage. In some implementations, the encoder 400 may have separate learning and filtering pathways. Implementations and examples of an encoder having separate learning and filtering pathways are shown and described below with respect to FIG. 6.

Figure 5:
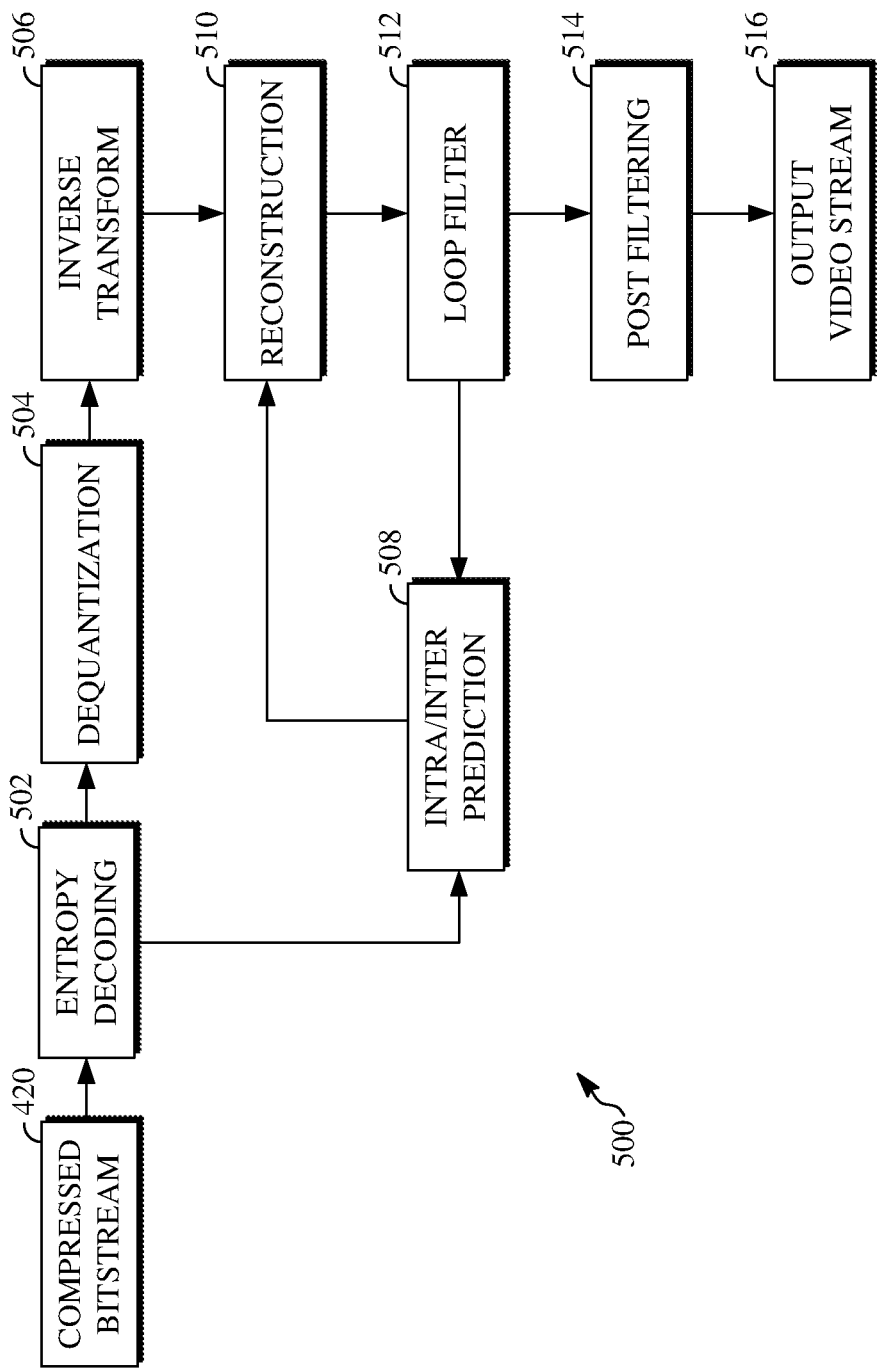
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514. In some implementations, the decoder 500 may have separate learning and filtering pathways. Implementations and examples of a decoder having separate learning and filtering pathways are shown and described below with respect to FIG. 7.

Referring to FIGS. 4 and 5, some stages of the encoder 400 and of the decoder 500 perform injective functions, while other stages of the encoder 400 and of the decoder 500 (e.g., the loop filtering stage 416 and the loop filtering stage 512) perform non-injective functions. With an injective function, the output is expected based on the input such that no two inputs will give you the same output. However, with a non-injective function, it is possible to have two distinct input give us the same output.

The loop filtering stage 416 and the loop filtering stage 512 perform non-injective functions designed to upscale or smooth out video frames, such as to make those video frames look better to the human eye. However, this upscaling and smoothing is harmful to learning models, since a learning model is generally a classifier. The learning model tries to classify the input into one of several categories.

Obscuring the input thus causes the learning model to less accurately classify it. Reference is made to the following data processing inequality:

$$I(f(X);Y) \leq I(X;Y)$$

where X and Y are random variables, f(•) is an arbitrary deterministic function, I(X; Y) denotes the mutual information between X and Y, and I(f(X); Y) denotes the mutual information between f(X) and Y. When f(•) is injective, the data processing inequality becomes the following data processing equality:

$$I(f(X);Y) = I(X;Y)$$

Furthermore, the data processing inequality becomes the following data processing strict inequality:

$$I(f(X);Y) < I(X;Y)$$

when there are two symbols $x_1 \neq x_2$ such that $$I(\hat{X};Y) > 0 \text{ and } f(x_1) = f(x_2)$$

where $\hat{X}$ is a random variable obtained from X as follows:

$$Pr\{\hat{X} = x_1 \mid Y = y\} =$$

$$1 - Pr\{\hat{X} = x_2 \mid Y = y\} = \frac{Pr\{\hat{X} = x_1 \mid Y = y\}}{Pr\{\hat{X} = x_1 \mid Y = y\} + Pr\{\hat{X} = x_2 \mid Y = y\}}$$

In the context of machine learning, the variable X represents the input to a machine learning aspect and the variable Y represents the output of that machine learning aspect. We can process X and Y to determine a correlation level between them. The more mutual information there is between X and Y, the higher the correlation level between them will be. The higher the correlation level is between X and Y, the more likely it is that the machine learning will perform well. The correlation level thus represents a measure of how the machine learning will perform.

Because a non-injective function has a one-to-many mapping such that the amount of mutual information between the input and output will not be high, the correlation level between X and Y will necessarily be low. As such, the above data processing inequality and data processing equality both imply that injective data processing is permissible, but the main purpose is likely for a reduction in computational complexity in training and/or inference. Similarly, the above data processing inequality and data processing strict inequality imply that non-injective data processing could negatively impact learning performance, for example, in terms of classification accuracy and/or learning complexity.

Figure 6:
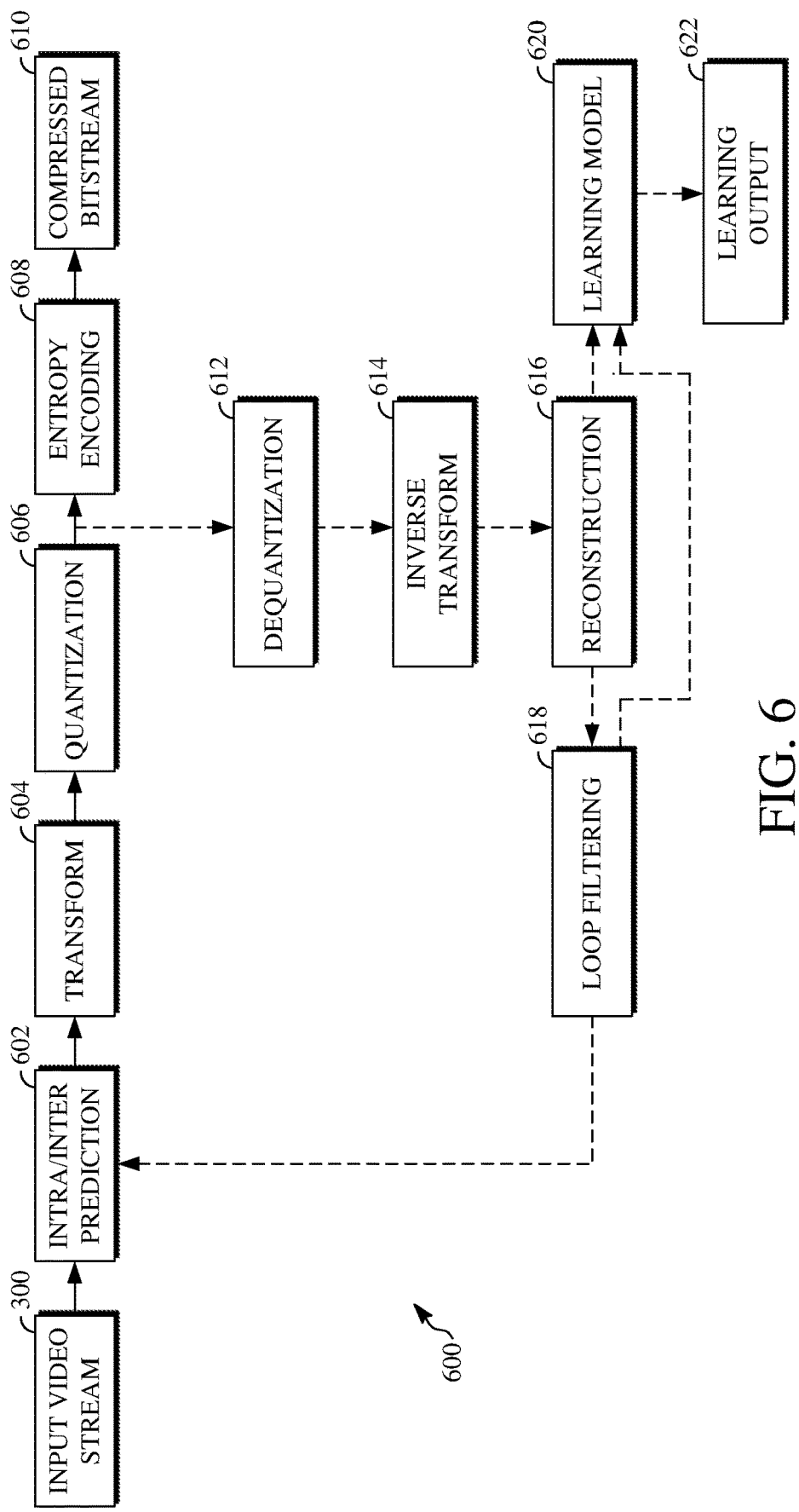
FIG. 6 is a block diagram of an example of an encoder including separate learning and filtering pathways.
Figure 7:
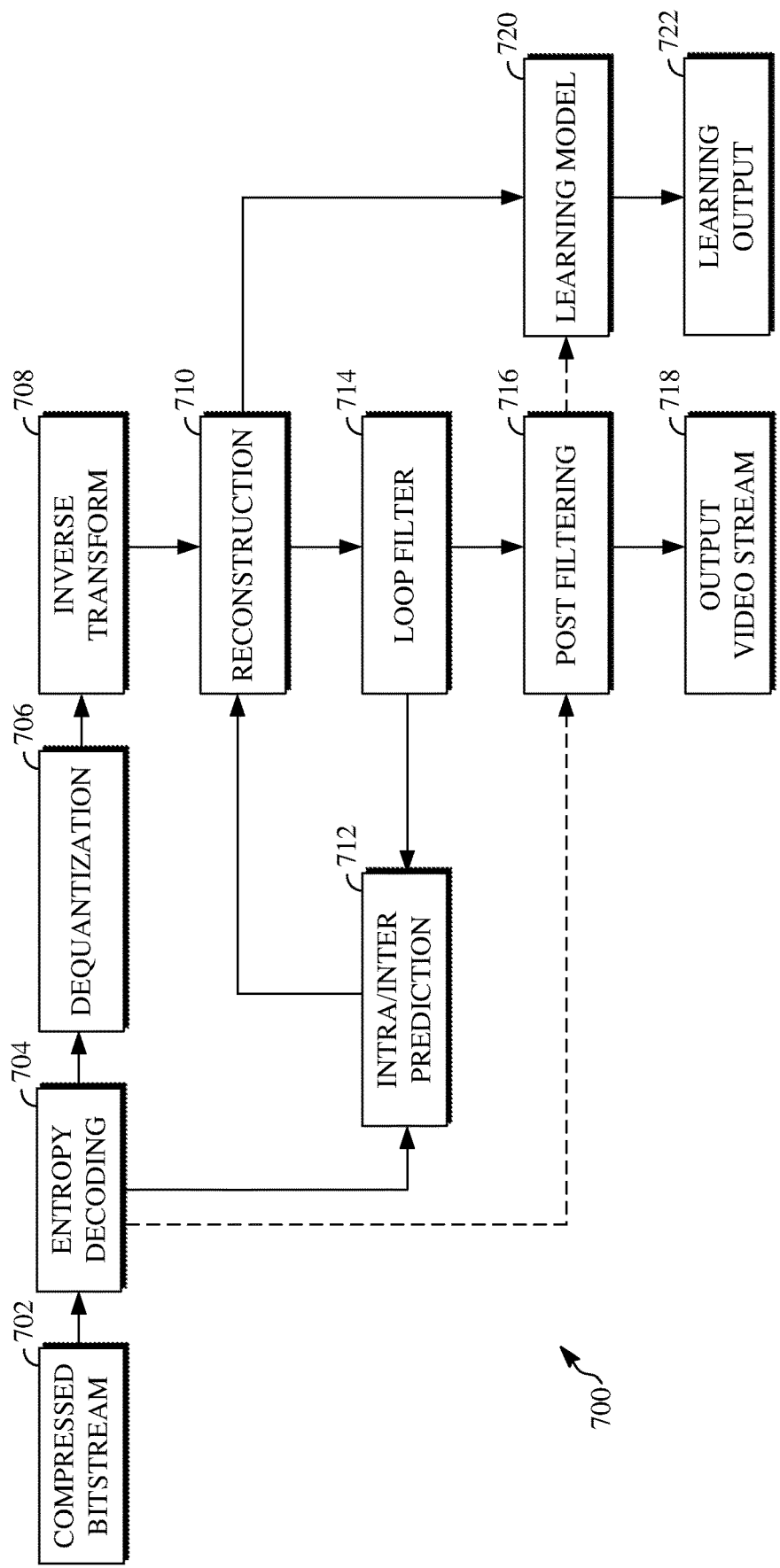
FIG. 7 is a block diagram of an example of a decoder including separate learning and filtering pathways.

Referring now to FIGS. 6 and 7, implementations and examples of encoders and decoders having separate learning and filtering pathways are described. FIG. 6 is a block diagram of an example of an encoder 600 including separate learning and filtering pathways. The encoder 600 includes an intra/inter prediction stage 602, a transform stage 604, a quantization stage 606, and an entropy coding stage 608, which may, for example, respectively be the intra/inter prediction stage 402, the transform stage 404, the quantization stage 406, and the entropy coding stage 408 shown in FIG. 4. The encoder 600 receives the input video stream 300 shown in FIG. 3 and processes the input video stream 300 using the intra/inter prediction stage 602, the transform stage 604, the quantization stage 606, and the entropy coding stage 608 to produce a compressed bitstream 610.

The encoder 600 further includes a reconstruction path shown by the dotted connection lines. The reconstruction path includes a dequantization stage 612, an inverse transform stage 614, and a reconstruction stage 616, which may, for example, respectively be the dequantization stage 410, the inverse transform stage 412, and the reconstruction stage 414 shown in FIG. 4. The reconstruction path of the encoder 600 includes two post-reconstruction pathways for processing the output of the reconstruction stage 616. A first post-reconstruction pathway (also referred to as a first pathway) includes a loop filtering stage 618, which may, for example, be the loop filtering stage 416 shown in FIG. 4.

A second post-reconstruction pathway (also referred to as a second pathway) includes a learning model stage 620. The learning model stage 620 trains a learning model using the output of the reconstruction stage 616. Alternatively, or additionally, the learning model stage 620 performs inference operations against the output of the reconstruction stage 616 using the learning model. For example, the learning model stage 620 may train the learning model to identify video content and/or image content within a reconstructed frame produced using the reconstruction stage 616. The learning model refers to a machine learning model or other machine learning or artificial intelligence approach. For example, the learning model may be or include a neural network, a deep neural network, a support vector machine, a cluster network, a Bayesian network, or another approach.

In some cases, information associated with the loop filtering stage 618 may be used at the learning model stage 620. For example, the learning model stage 620 may use filter side information from the loop filtering stage 618. The filter side information indicates parameters, configurations, or other information used to filter the reconstructed frame at the loop filtering stage 618. In such a case, the operations performed at the learning model stage 620 may include determining whether to use the filter side information for the learning. In the event a determination is made to not use the filter side information for the learning, the filter side information may be discarded or otherwise ignored.

The output of the first post-reconstruction pathway is fed back into the intra/inter prediction stage 602. As such, the output of the first post-reconstruction pathway may be used to produce the compressed bitstream 610. In contrast, the output of the second post-reconstruction pathway is output as learning output 622. The learning output 622 is not used to produce the compressed bitstream 610. Rather, the learning output 622 represents output of the learning model stage 620. The output of the learning model stage 620 may refer to output from training operations performed at the learning model stage 620, output from inference operations performed at the learning model stage 620, or both.

Training the learning model at the learning model stage 620 using the reconstructed frame (e.g., without filtering performed thereto) results in a greater classification accuracy upper bound for the learning model than training the learning model using the filtered frame produced at the loop filter stage 618. That is, filtering the reconstructed frame causes some information of the reconstructed frame to be lost (e.g., by reducing blocking artifacts therein or otherwise). The amount of mutual information between the reconstructed frame and the filtered frame is therefore potentially reduced. The amount of mutual information between the reconstructed frame used as input to the learning model stage 620 and the learning output 622 is thus potentially higher than the amount of mutual information between the filtered frame and the learning output 622. As such, there is a greater correlation between the reconstructed frame and the learning output 622 than there is between the filtered frame and the learning output 622.

In some implementations, the second post-reconstruction pathway may begin at the input to the loop filtering stage 618. For example, instead of the second post-reconstruction pathway starting as a separate output from the reconstruction stage 616, the second post-reconstruction pathway and the first post-reconstruction pathway may both start as the same output from the reconstruction stage 616. The input to the loop filtering stage 618 may thus instead be used to start the second post-reconstruction pathway.

In some implementations, the loop filtering stage 618 may be replaced by another filtering stage. For example, the loop filtering stage 618 may be replaced by a deblocking filter stage, a denoising filter stage, a sample adaptive offset filter stage, a post filter stage, another filter stage, or a combination thereof.

FIG. 7 is a block diagram of an example of a decoder 700 including separate learning and filtering pathways. The decoder 700 receives a compressed bitstream 702, which may, for example, be the compressed bitstream 610 produced using the encoder 600 shown in FIG. 6. The decoder 700 decodes encoded data from the compressed bitstream 702 using an entropy decoding stage 704, a dequantization stage 706, an inverse transform stage 708, a reconstruction stage 710, and an intra/inter prediction stage 712, which may, for example, respectively be the entropy decoding stage 502, the dequantization stage 504, the inverse transform stage 506, the reconstruction stage 510, and the intra/inter prediction stage 508 shown in FIG. 5.

The decoder 700 further includes two post-reconstruction pathways for processing the output of the reconstruction stage 710. A first post-reconstruction pathway (also referred to as a first pathway) of the decoder 700 includes a loop filter stage 714 and a post filtering stage 716, which may, for example, respectively be the loop filter stage 512 and the post filtering stage 514 shown in FIG. 5. The output of the first post-reconstruction pathway of the decoder 700 is an output video stream 718. The output video stream 718 is a video stream output for display at a user device. In some cases, the post filtering stage 716 may be omitted from the first post-reconstruction pathway of the decoder 700.

A second post-reconstruction pathway (also referred to as a second pathway) of the decoder 700 includes a learning model stage 720. The learning model stage 720 may, for example, perform the same operations as, or operations similar to, those performed using the learning model stage 620 of the encoder 600 shown in FIG. 6. As such, the learning model stage 720 trains a learning model using the output of the reconstruction stage 710. Alternatively, or additionally, the learning model stage 720 performs inference operations against the output of the reconstruction stage using the learning model. The output of the learning model stage 720 is learning output 722. The learning output 722 may be the same as or similar to the learning output 622 produced using the learning model stage 620 shown in FIG. 6.

In some cases, information associated with the loop filtering stage 714 may be used at the learning model stage 720. For example, the learning model stage 720 may use filter side information from the loop filtering stage 714. The filter side information indicates parameters, configurations, or other information used to filter the reconstructed frame at the loop filtering stage 714. In such a case, the operations performed at the learning model stage 720 may include determining whether to use the filter side information for the learning. In the event a determination is made to not use the filter side information for the learning, the filter side information may be discarded or otherwise ignored. The learning model stage 720 may receive the filter side information from the loop filtering stage 714. Alternatively, the learning model stage 720 may receive the filter side information from the entropy decoding stage 704.

Similar to as described above with respect to the learning output 622, training the learning model at the learning model stage 720 using the second copy of the reconstructed frame results in a greater classification accuracy upper bound for the learning model than training the learning model using the filtered frame produced at the loop filter stage 714. This is because the amount mutual information between the reconstructed frame used as input to the learning model stage 720 and the learning output 722 is thus potentially higher than the amount of mutual information between the filtered frame and the learning output 722.

In some implementations, the second post-reconstruction pathway may begin at the input to the loop filtering stage 714. For example, instead of the second post-reconstruction pathway starting as a separate output from the reconstruction stage 710, the second post-reconstruction pathway and the first post-reconstruction pathway may both start as the same output from the reconstruction stage 710. The input to the loop filtering stage 714 may thus instead be used to start the second post-reconstruction pathway.

Figure 8:
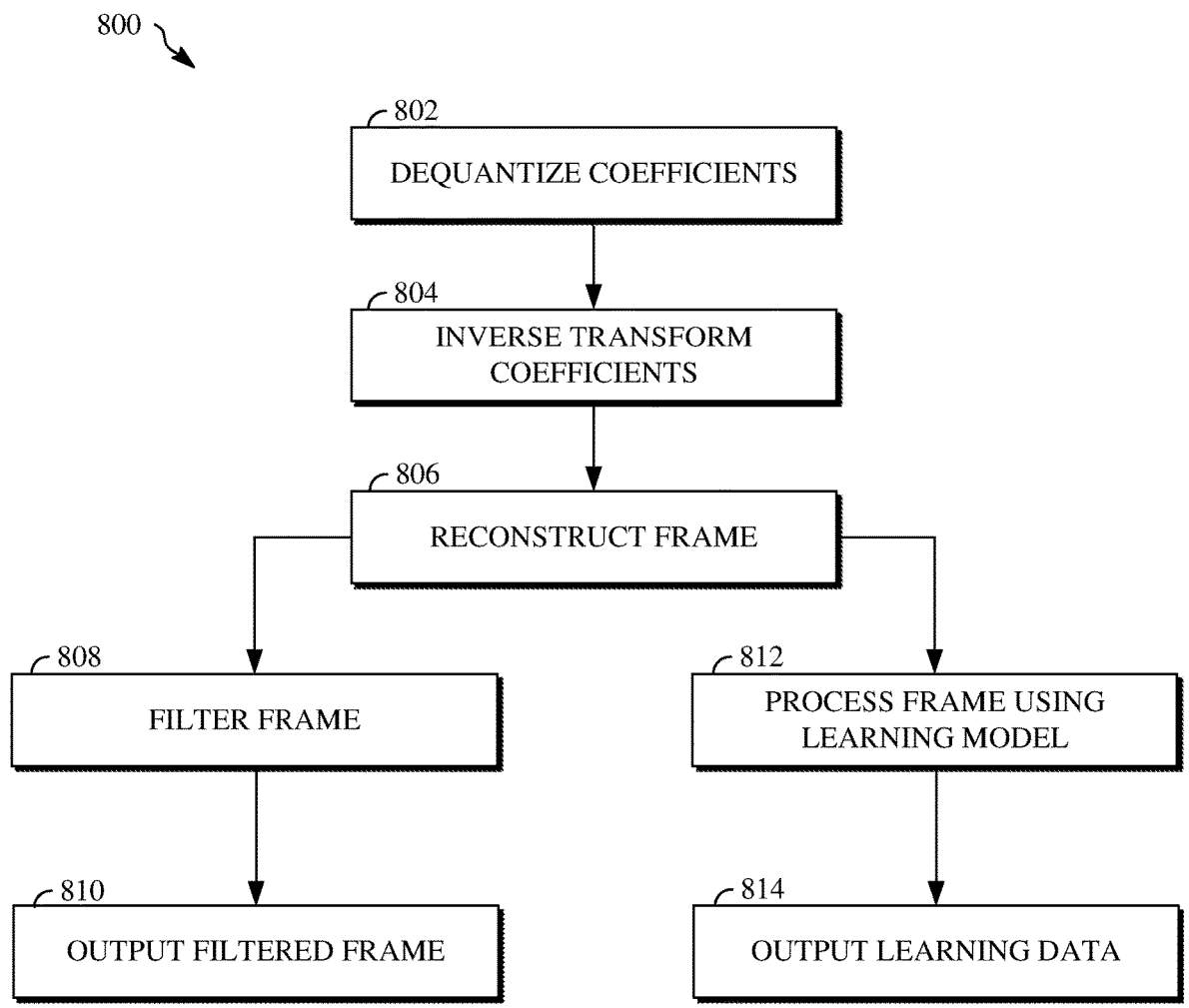
FIG. 8 is a flowchart diagram of an example of a technique for video coding using separate learning and filtering pathways.
Figure 9:
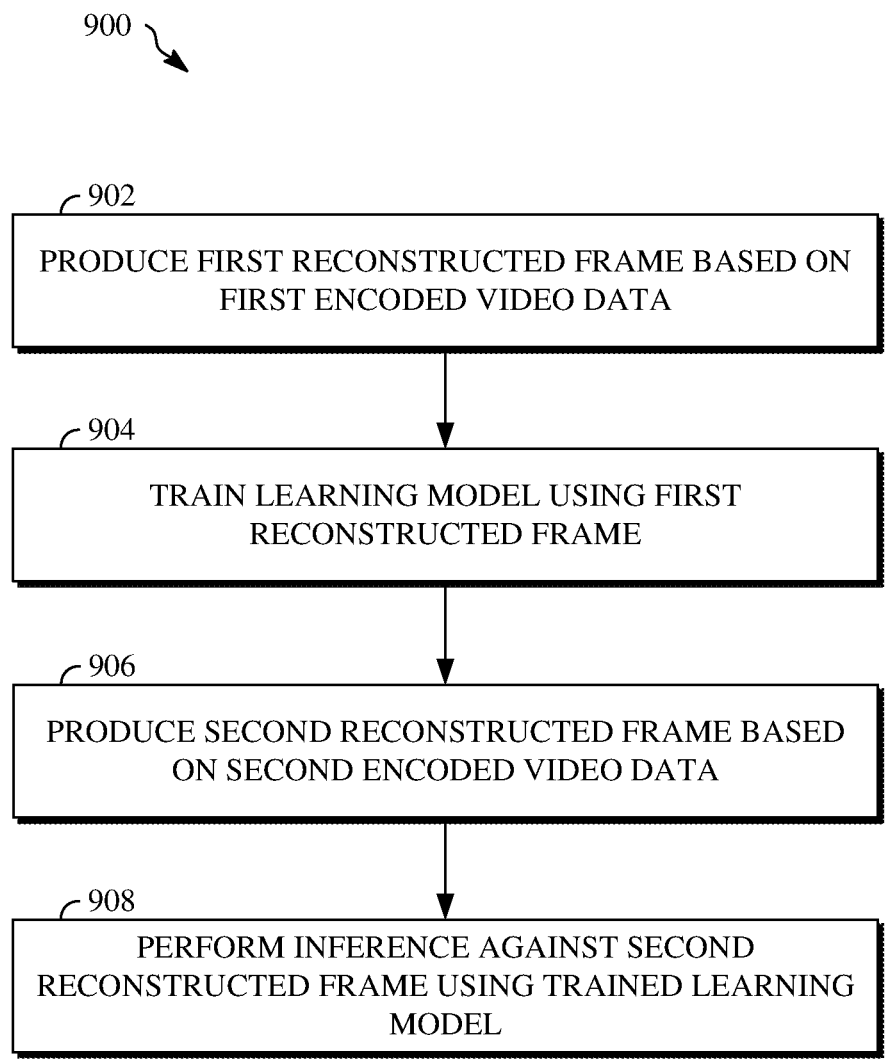
FIG. 9 is a flowchart diagram of an example of a technique for training and inference using a learning model for video coding.

Further details of techniques for video coding using separate learning and filtering pathways are now described. FIG. 8 is a flowchart diagram of an example of a technique 800 for video coding using separate learning and filtering pathways. FIG. 9 is a flowchart diagram of an example of a technique 900 for training and inference using a learning model for video coding.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the techniques 800 and 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for video coding using separate learning and filtering pathways is shown. At 802, quantized transform coefficients representative of video and/or image data are dequantized. The quantized transform coefficients may, for example, represent quantized transform coefficients of a video block to encode or of an encoded video block to decode. Transform coefficients are produced as a result of the dequantizing. At 804, the transform coefficients are inverse transformed. A prediction residual is produced as a result of the inverse transforming. At 806, the prediction residual is reconstructed to produce a reconstructed frame. The reconstructed frame is a video frame or image that includes a video block or image block reconstructed based on the prediction residual.

Two pathways follow from 806. A first pathway includes operations performed at 808 and 810. A second pathway includes operations performed at 812 and 814. Both of the first pathway and the second pathway perform their respective operations against a reconstructed frame (e.g., as produced at 806). As such, the functionality of the first pathway may be described with respect to a first copy of the reconstructed frame, and the functionality of the second pathway may be described with respect to a second copy of the reconstructed frame. However, use of the term "copy" in this context does not necessarily imply that a reconstructed frame (e.g., as produced at 806) has actually been copied. Rather, the use of the terms "first copy" and "second copy" are simply to denote that the first pathway and the second pathway may both receive the same reconstructed frame as input.

According to the first pathway, at 808, the first copy of the reconstructed frame is filtered. Filtering the reconstructed frame includes using one or more filtering techniques. The filtering techniques refer to non-injective functions performed using one or more filters of a video or image codec. The filter may, for example, be an in-loop filter, a deblocking filter, a denoising filter, a sample adaptive offset filter, a post filter, another filter, or a combination thereof. A filtered frame is produced as a result of filtering the first copy of the reconstructed frame. At 810, the filtered frame is output. For example, the filtered frame can be included in an output video stream for display at a user device.

According to the second pathway, at 812, the second copy of the reconstructed frame is processed using a learning model. Processing the second copy of the reconstructed frame using the learning model can include training the learning model using the second copy of the reconstructed frame. For example, training the learning model using the second copy of the reconstructed frame includes training the learning model to identify video content using the second copy of the reconstructed frame. The learning model classifies the content of the second copy of the reconstructed frame. The output of that classification may then be used to identify video content, such as objects or other visuals within other video frames.

Additionally, or alternatively, processing the second copy of the reconstructed frame using a learning model can include performing one or more inference operations against the second copy of the reconstructed frame using a trained learning model. For example, performing inference operations against the second copy of the reconstructed frame using a trained learning model can include classifying content of the second copy of the reconstructed frame according to a trained classification model, determining a class index in classification therefor, or otherwise identifying video semantics associated with the second copy of the reconstructed frame using a trained video semantic model.

At 814, learning model data is output. For example, the output learning model data may refer to data associated with a training of the learning model, such as a residue training error, an accuracy of the classification on a verification set, or both. In another example, the output learning model data may refer to data associated with inference performed using the trained learning model, such as a class index in classification, a labeled segment or annotation associated with some or all of the second copy of the reconstructed frame, or both.

Each function performed at the dequantization stage, the inverse transform stage, the reconstruction stage, and the second post-reconstruction pathway is an injective function. However, some or all of the functions performed at the first pathway (e.g., filtering functions used to produce the filtered frame) are non-injective functions. Thus, the filtered frame is produced using at least one non-injective function, whereas the second copy of the reconstructed frame is produced without using a non-injective function. As a result, training the learning model using the second copy of the reconstructed frame results in a greater classification accuracy upper bound for the learning model than training the learning model using the filtered frame.

In some implementations, the operations for training the learning model may include training the learning model using the second copy of the reconstructed frame and filter side information. For example, the filter side information may indicate information about the filtering performed at the first pathway. The filter side information may be received from the first pathway (e.g., from an in-loop filter or other filter that performs the filtering for the first pathway). Alternatively, the filter side information may otherwise be information used for the filtering of the first copy of the reconstructed frame at the first pathway.

In some such implementations, the operations for training the learning model using the second copy of the reconstructed frame and the filter side information may include determining whether the filter side information is useful for training the learning model. In the event a determination is made that the filter side information is not useful for training the learning model, the filter side information may be discarded or otherwise ignored.

In some implementations, the second pathway may include training the learning model. For example, training the learning model can include comparing the output of the learning model against an expected output. That is, a cost function can be used to measure the difference between the actual learning model output and the expected learning model output. Values resulting from the cost function may then be used to train the learning model.

In some implementations, the technique 800 may include operations for entropy decoding syntax elements from an encoded bitstream before dequantizing the coefficients at 802. For example, where the technique 800 is performed using a decoder (e.g., the decoder 700 shown in FIG. 7) or otherwise for decoding encoded video and/or image data, such as an encoded video frame, the technique 800 may begin by entropy decoding syntax elements representative of the encoded video frame from the encoded bitstream, such as to produce quantized transform coefficients. The quantized transform coefficients may then be dequantized. Each function performed at the entropy decoding stage is an injective function.

In some implementations, the second pathway may include performing inference operations against the second copy of the reconstructed frame or other encoded video data or encoded image data. For example, instead of training the learning model using the second copy of the reconstructed frame, the learning model may already be trained. The learning model may thus be used for inference of the second copy of the reconstructed frame, such as to identify the content thereof. In some such implementations, the second pathway may omit operations for training the learning model. The output of the second pathway would thus be inference data rather than training data.

Referring next to FIG. 9, the technique 900 for training and inference using a learning model for video coding is shown. In particular, the technique 900 describes training operations and inference operations, both performed at a second pathway of an encoder or decoder (e.g., the encoder 600 shown in FIG. 6 or the decoder 700 shown in FIG. 7). For example, the training operations and inference operations described with respect to the technique 900 may be performed at different times, such as where the training operations are performed before the inference operations.

At 902, a first reconstructed frame is produced based on first encoded video data. Producing the first reconstructed frame can include dequantizing quantized transform coefficients to produce transform coefficients, inverse transforming the transform coefficients to produce a prediction residual, and reconstructing the prediction residual to produce the first reconstructed frame. At 904, a learning model is trained using the first reconstructed frame. In some cases, the learning model may also be trained using filter side information.

At 906, a second reconstructed frame is produced based on second encoded video data. Producing the second reconstructed frame can include dequantizing quantized transform coefficients to produce transform coefficients, inverse transforming the transform coefficients to produce a prediction residual, and reconstructing the prediction residual to produce the second reconstructed frame. At 908, the trained learning model is used to perform one or more inference operations against the second reconstructed frame.

The first encoded video data and second encoded video data may or may not derive from a common source. For example, the first encoded video data may correspond to a first video frame of a video stream or bitstream and the second encoded video data may correspond to a second video frame of that same video stream or bitstream. The second video frame is later than the first video frame in a coding and/or display order for the video stream or bitstream (e.g., immediately following the first video frame or otherwise after the first video frame). In another example, the first encoded video data may correspond to a video frame of a first video stream or first bitstream and the second encoded video data may correspond to a video frame of a second video stream or second bitstream. The second video stream or second bitstream may be processed sometime after the first video stream or second bitstream.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 or 600 and the decoder 500 or 700) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400 or 600, can encode content into an encoded video signal and transmit the encoded video signal to the communications device. In turn, the communications device can then decode the encoded video signal using a decoder 500 or 700. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 or 600 may also include a decoder 500 or 700.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A decoder, comprising:
an entropy decoding stage that entropy decodes syntax elements representative of an encoded video frame from an encoded bitstream to produce quantized transform coefficients;
a dequantization stage that dequantizes the quantized transform coefficients to produce transform coefficients;
an inverse transform stage that inverse transforms the transform coefficients to produce a prediction residual;
a reconstruction stage that reconstructs the prediction residual to produce a reconstructed frame;
a first post-reconstruction pathway that filters a first copy of the reconstructed frame using one or more filtering techniques and outputs the filtered frame within an output video stream for display at a user device; and
a second post-reconstruction pathway that trains a learning model for video content identification using a second copy of the reconstructed frame and outputs a trained learning model, wherein training the learning model using the second copy of the reconstructed frame results in a greater classification accuracy upper bound for the learning model than training the learning model using the filtered frame.

2. The decoder of claim 1, wherein the second post-reconstruction pathway trains the learning model using the second copy of the reconstructed frame and filter side information received from the first post-reconstruction pathway.

3. The decoder of claim 1, wherein each function performed at the entropy decoding stage, the dequantization stage, the inverse transform stage, the reconstruction stage, and the second post-reconstruction pathway is an injective function, wherein at least one function performed at the first post-reconstruction pathway is a non-injective function.

4. The decoder of claim 1, wherein the reconstructed frame is a first reconstructed frame, wherein the reconstruction stage produces a second reconstruction frame, wherein the first post-reconstruction pathway filters a first copy of the second reconstructed frame, wherein the second post-reconstruction pathway performs one or more inference operations against a second copy of the second reconstructed frame using the trained learning model.

5. The decoder of claim 1, wherein the one or more filtering techniques include a filtering technique performed using an in-loop filter.

6. A method, comprising:
dequantizing quantized transform coefficients representative of encoded video data to produce transform coefficients;
inverse transforming the transform coefficients to produce a prediction residual;
reconstructing the prediction residual to produce a reconstructed frame;
filtering a first copy of the reconstructed frame to produce a filtered frame to include within an output video stream; and
training and outputting a learning model, wherein training the learning model includes processing a second copy of the reconstructed frame to identify video content.

7. The method of claim 6, wherein training and outputting the learning model comprises:
training the learning model to identify the video content using the second copy of the reconstructed frame.

8. The method of claim 7, wherein training the learning model using the second copy of the reconstructed frame results in a greater classification accuracy upper bound for the learning model than training the learning model using the filtered frame.

9. The method of claim 7, wherein training the learning model to identify the video content using the second copy of the reconstructed frame comprises:
training the learning model using filter side information, wherein the filter side information is used for the filtering of the first copy of the reconstructed frame.

10. The method of claim 6, wherein the filtered frame is produced using at least one non-injective function, wherein the second copy of the reconstructed frame is produced without using the at least one non-injective function.

11. The method of claim 6, wherein filtering the first copy of the reconstructed frame to produce the filtered frame to include within the output video stream comprises:
processing the first copy of the reconstructed frame using an in-loop filter.

12. The method of claim 6, wherein the encoded video data is first encoded video data, the method further comprising:
performing one or more inference operations against second encoded video data using the trained learning model.

13. The method of claim 6, wherein the encoded video data is decoded from an encoded bitstream, the method further comprising:
outputting the filtered frame within the output video stream for display at a user device.

14. An integrated circuit comprising a processor that executes instructions, the instructions comprising:
decoding encoded video data from an encoded bitstream to produce a reconstructed frame;
processing a first copy of the reconstructed frame over a first decoding pathway using an in-loop filter to produce an output video stream for display at a user device; and
processing a second copy of the reconstructed frame over a second decoding pathway to train and output a learning model for identifying video content.

15. The integrated circuit of claim 14, wherein the instructions for decoding the encoded video data from the encoded bitstream to produce the reconstructed frame comprise instructions for:
dequantizing quantized transform coefficients representative of the encoded video data to produce transform coefficients;
inverse transforming the transform coefficients to produce a prediction residual; and
reconstructing the prediction residual to produce a reconstructed frame.

16. The integrated circuit of claim 14, wherein the instructions for processing the second copy of the reconstructed frame over the second decoding pathway to train and output the learning model for identifying the video content comprise instructions for:
training the learning model using the second copy of the reconstructed frame.

17. The integrated circuit of claim 16, wherein the instructions for training the learning model using the second copy of the reconstructed frame comprise instructions for:
training the learning model using filter side information from the first decoding pathway.

18. The integrated circuit of claim 14, wherein the encoded video data is decoded from an encoded bitstream and the instructions comprise instructions for:
 performing one or more inference operations against second encoded video data using the trained learning model.

19. The integrated circuit of claim 14, wherein training the learning model by processing the second copy of the reconstructed frame results in a greater classification accuracy upper bound for the learning model than training the learning model by processing a filtered frame produced by filtering the first copy of the reconstructed frame using the in-loop filter.

20. The integrated circuit of claim 14, wherein processing the first copy of the reconstructed frame over the first decoding pathway includes using at least one non-injective function, wherein processing the second copy of the reconstructed frame over the second decoding pathway omits using the at least one non-injective function.

\* \* \* \* \*